April 28, 1970     M. L. CAMPBELL     3,508,519

PUSHBUTTON FLAG

Filed Nov. 4, 1968     2 Sheets-Sheet 1

INVENTOR.
MELVIN L. CAMPBELL

BY *Donald W. Phillion*
ATTORNEY

INVENTOR.
MELVIN L. CAMPBELL
BY Donald W. Pullion
ATTORNEY

United States Patent Office 3,508,519
Patented Apr. 28, 1970

3,508,519
PUSHBUTTON FLAG
Melvin L. Campbell, Marion, Iowa, assignor to Collins Radio Company, Dallas, Tex., a corporation of Iowa
Filed Nov. 4, 1968, Ser. No. 772,986
Int. Cl. G09f 9/00
U.S. Cl. 116—124                                    8 Claims

ABSTRACT OF THE DISCLOSURE

A device for mechanically indicating the state of a two-position pushbutton, comprising a spring-like element having an M shaped cross section with the open side thereof being forced in the side of the pushbutton by means of an edge of the equipment chassis; said edge fitting into the V center portion of the M and thereby forming a fulcrum. As the pushbutton is moved in and out of its two positions, the M shaped spring pivots about the chassis edge and one of the legs of the M shaped element alternately moves in front of, and to the side of, the front surface of the pushbutton.

---

This invention relates generally to indication devices and more particularly to a bi-stable mechanical indication device which responds to the positioning of a two-position pushbutton switch to position itself in front of the pushbutton when said pushbutton is depressed, and further, which positions itself at the side of said pushbutton when said pushbutton is in its other position.

In many devices activated by pushbuttons, it is important to know whether the pushbutton is in its normal out position or, alternatively, in its depressed position. For example, pushbuttons are commonly used in air navigation equipment to select a particular one of several modes of operation. It is important to the pilot to know instantly and accurately whether a pushbutton is in its out position or in its depressed position.

A common way of indicating the status of a pushbutton is by lighting means which can be arranged in any one of several well known ways. However, during the daylight hours and particularly when the sun enters the cockpit at certain angles, it is often difficult to determine when a light is on or when it is off.

It is a primary object of the present invention to provide a reliable way to determine the position of a two-position pushbutton during daylight hours and also during the nighttime.

A second purpose of the invention is an inexpensive and virtually error free means for mechanically indicating the status of a two-position pushbutton.

A third aim of the invention is a simple mechanical means for indicating the position of a two-position pushbutton which is equally effective during daylight hours and at nighttime.

A fourth object of the invention is the improvement of pushbutton status indicating means generally.

In accordance with the invention, there is provided, in combination with a two-position pushbutton having a normal out position and depressed, pushed-in position, a housing means located adjacent one side of said pushbutton means and a length of springlike material, having an M shaped cross-sectional configuration, positioned partially within this housing means with one edge of said housing means resting in the top V portion of the M shaped spring and pressing said M shaped spring into the side of the pushbutton. When the pushbutton is in its out position one of the legs of the M shaped strip extends over the edge of the back surface of the pushbutton and the other leg lies within the housing so that no appreciable part of the M shaped strip is visible from the front surface of the pushbutton. When the pushbutton is depressed to its in position, the back leg of the M shaped strip is also depressed, causing the M shaped strip to pivot on the edge of the housing resting in the V portion thereof to thereby bring the front leg of the M over the edge of the front surface of the pushbutton.

It is this front leg of the M shaped strip that is seen by the observer when the pushbutton is in its depressed position.

In accordance with a feature of the invention, the front leg of the M shaped strip can have a symbol formed therethrough, such as the word "ON," for example, which can be illuminated by a light located in back of the transparent or translucent pushbutton. Thus the symbol "ON" is easily seen by the observer at night, as well as during the daytime. In the daytime the symbol "ON" can easily be seen by the observer without the aid of a light source.

In accordance with another feature of the invention the M shaped element pivots on a pin which extends longitudinally along the base of the V portion of the M shaped element and is secured at its ends in the housing.

The above mentioned and other objects and features of the invention will be more fully understood from the following detailed description thereof when read in conjunction with the drawings in which.

Figure 1A:
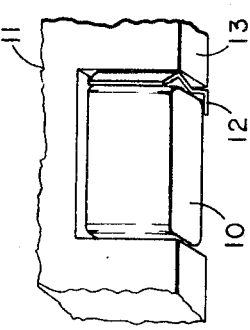
FIGS. 1A and 1B illustrate the relative positions of the pushbutton switch, the housing, and the M shaped strip when said pushbutton switch is in its out position.

Referring now to FIG. 1A there is shown the pushbutton switch 10 which is positioned in a mounting 11. Said mounting has a housing portion 13 therein in which is partially positioned an M shaped strip 12 which is of a spring-like material such as, for example, steel.

Figure 1B:
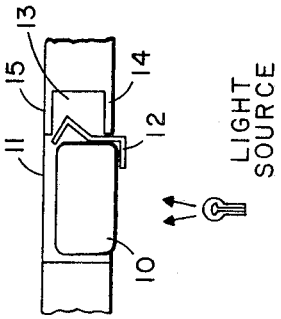

The housing 13 is bounded at the front and back by two lips 15 and 14, respectively, with the lip 14 pressing into the M shaped strip just below the center of the V portion thereof as shown in FIG. 1B. As the pushbutton is depressed inward and moved outward between its two positions, the lip 14 will act as a fulcrum around which the M shaped strip of metal 12 will pivot as will be shown later in FIGS. 2 and 3. A light source 16 located on the back side of the pushbutton 10 illuminates the pushbutton, which can be, for example, of a Lucite material. Such light can be connected to be energized only when the pushbutton switch is in its depressed position, or, alternatively, at all times.

Figure 2A:
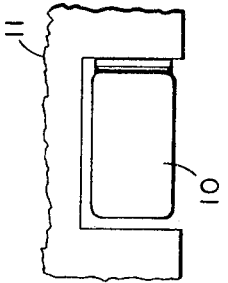
FIGS. 2A and 2B show the relative positions of the pushbutton switch, the housing, and the M shaped spring when the pushbutton switch is partially depressed.
Figure 2B:
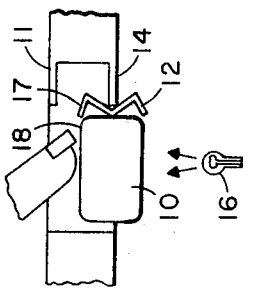

Referring now to FIG. 2, the pushbutton 10 is shown in FIG. 2B as being half depressed. The M shaped strip 12 is pivoting about lip 14 so that the upper or front leg of the M is beginning to move around to the front surface 18 of the pushbutton. As can be seen from FIG. 2A, the front leg 17 of the M shaped strip is still not visible to the observer.

Figure 3A:
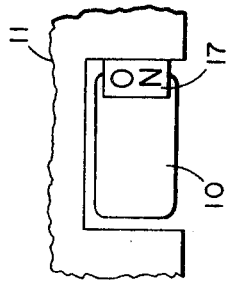
FIGS. 3A and 3B illustrate the relative positions of the pushbutton switch, the housing, and the M shaped strip when the pushbutton is fully depressed.

In FIG. 3, however, the pushbutton is shown fully depressed and the front leg 17 of the M shaped strip 12 is now fully extended across one edge of the front surface of the pushbutton 10 and can be seen by an observer. As shown in FIG. 3A the symbol "ON" formed on or through the leg provides easily seen visual indication that the pushbutton has been depressed and that a certain equipment or mode of operation has been activated.

Figure 3B:
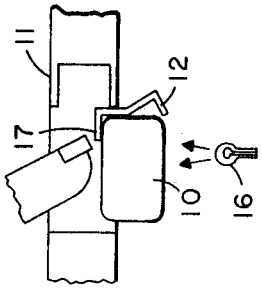
Figure 4:
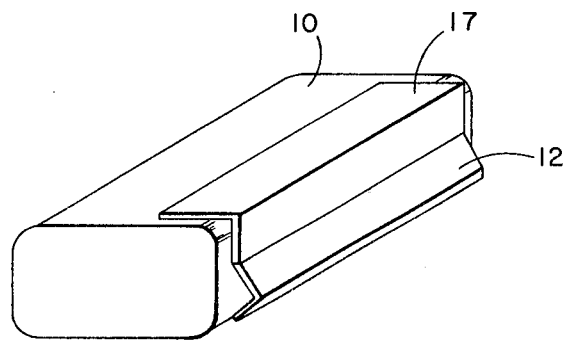
FIG. 4 is a perspective view of the pushbutton switch and M shaped strip when said pushbutton switch is fully depressed.

In FIG. 4 there is shown a perspective view of the condition of FIGS. 3A and 3B wherein the pushbutton 10 is fully depressed and the front leg 17 of the M shaped strip 12 lies on the front surface of said pushbutton 10.

Figure 5:
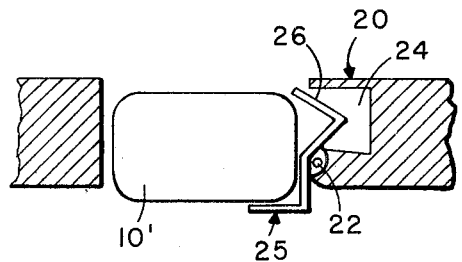
FIG. 5 shows another form of the invention.

Referring now to FIG. 5 the spring-like element 25 is mounted on a pivot pin 22 which in turn is secured in the frame or casing 20. As the button 10' is depressed, element 25 will pivot on pin 22 so that the top leg 26 thereof will move over in front of the button 10' and be visible to the observer.

It is to be understood that the form of the invention shown and described herein is but a preferred embodiment thereof and that various changes may be made in the structure without departing from the spirit of scope of the invention.

What is claimed is:

1. A device for indicating the status of a two position pushbutton means comprising:
   chassis means for holding said pushbutton means and comprising housing means positioned adjacent said pushbutton means;
   a spring-like element having an M shaped cross section and positioned in said housing with the open side of the M being forced against the side of said pushbutton means by said housing;
   said housing being formed to press into the V center portion of the M to force said M shaped spring-like element into the side of said pushbutton means;
   said M shaped spring-like element being of a size to have the back leg thereof depressed by said pushbutton means when said pushbutton means is depressed to its in position, to pivot the front leg of the M shaped element in front of said pushbutton means, and to have the front leg of said M shaped element depressed and pivoted to the side of said pushbutton means when said pushbutton means is moved to its out position.

2. A device in accordance with claim 1 comprising:
   pin means positioned perpendicularly to that plane containing the M shaped cross section of said spring-like element and secured to said spring-like element near the base of the V portion thereof;
   the ends of said pin means being supported in said chassis;
   said spring-like element responsive to the movement of said pushbutton means between its two positions to pivot around said pin means.

3. A device in accordance with claim 2 in which:
   said pushbutton means is of a material that will pass light therethrough;
   in which the front leg of said M shaped spring-like element that moves in front of said pushbutton means has a portion thereof formed to pass light;
   and comprising:
   light source means positioned behind said pushbutton means.

4. A device in accordance with claim 1 in which:
   said pushbutton means is of a material that will pass light therethrough;
   in which the front leg of said M shaped spring-like element that moves in front of said pushbutton means has a portion thereof formed to pass light;
   and comprising:
   light source means positioned behind said pushbutton means.

5. In combination with a two-position pushbutton means contained in a chassis, a device for indicating the position of said pushbutton means comprising:
   housing means formed in said chassis adjacent said pushbutton means;
   a spring-like element having an M shaped cross section and positioned in said housing with the open side of said M facing said pushbutton means;
   said housing means being shaped to have a portion thereof press into the V portion of the M and to force said M shaped spring-like element into said pushbutton means;
   said M shaped spring-like element having a size relative to said pushbutton means to have said pushbutton means press against the two legs thereof as said pushbutton means is moved between its two positions, to cause said M shaped spring-like element to pivot about that portion of the housing pressing into the V thereof;
   said M shaped spring-like element further constructed to pivot its front leg in front of said pushbutton means when said pushbutton is depressed.

6. A combination in accordance with claim 5 comprising:
   pin means positioned perpendicularly to that plane containing the M shaped cross section of said spring-like element and secured to said spring-like element near the base of the V portion thereof;
   the ends of said pin means being supported in said chassis;
   said spring-like element responsive to the movement of said pushbutton means between its two positions to pivot around said pin means.

7. A combination in accordance with claim 6 in which:
   said pushbutton means is of a material that will pass light therethrough;
   in which the front leg of said M shaped spring-like element that moves in front of said pushbutton means has a portion thereof formed to pass light;
   and comprising:
   light source means positioned behind said pushbutton means.

8. A combination in accordance with claim 5 in which:
   said pushbutton means is of a material that will pass light therethrough;
   in which the front leg of said M shaped spring-like element that moves in front of said pushbutton means has a portion thereof formed to pass light;
   and comprising:
   light source means positioned behind said pushbutton means.

References Cited

UNITED STATES PATENTS

| | | |
|---|---|---|
| 1,426,447 | 8/1922 | Apfel. |
| 2,050,698 | 8/1936 | Gaynor _____ 200—167 XR |
| 3,267,234 | 8/1966 | Stewart et al. _____ 200—167 |
| 3,312,794 | 4/1967 | Hollyday _____ 200—42 |

LOUIS J. CAPOZI, Primary Examiner

U.S. Cl. X.R.

116—114; 200—167, 172